US012623655B2

(12) United States Patent
Park et al.

(10) Patent No.: US 12,623,655 B2
(45) Date of Patent: May 12, 2026

(54) VEHICLE FOR AVOIDING COLLISION AND METHOD OF OPERATING THE VEHICLE

(71) Applicants: Hyundai Motor Company, Seoul (KR); Kia Corporation, Seoul (KR); Ajou University Industry-Academic Cooperation Foundation, Suwon-si (KR)

(72) Inventors: Jong Sung Park, Hwaseong-si (KR); Young Bin Min, Busan (KR); Jong Hyuck Lee, Hwaseong-si (KR); Chan Jong Jang, Daegu (KR); Bong Sob Song, Seongnam-si (KR); Ji Min Lee, Hwaseong-si (KR); Sung Woo Lee, Suwon-si (KR)

(73) Assignees: Hyundai Motor Company, Seoul (KR); Kia Corporation, Seoul (KR); AJOU University Industry-Academic Cooperation Foundation, Suwon-si (KR)

( * ) Notice: Subject to any disclaimer, the term of this patent is extended or adjusted under 35 U.S.C. 154(b) by 170 days.

(21) Appl. No.: 18/516,386

(22) Filed: Nov. 21, 2023

(65) Prior Publication Data

US 2024/0174223 A1     May 30, 2024

(30) Foreign Application Priority Data

Nov. 25, 2022    (KR) ........................ 10-2022-0160436

(51) Int. Cl.
*B60W 30/09* (2012.01)
*B60W 30/095* (2012.01)
(Continued)

(52) U.S. Cl.
CPC ........ *B60W 30/09* (2013.01); *B60W 30/0956* (2013.01); *B60W 40/072* (2013.01); *B60W 40/076* (2013.01); *G08G 1/167* (2013.01)

(58) Field of Classification Search
CPC ............. B60W 30/09; B60W 30/0956; B60W 40/072; B60W 40/076; B60W 2554/801;
(Continued)

(56) References Cited

U.S. PATENT DOCUMENTS

2017/0232970 A1* 8/2017 Schaper ................ B60W 40/04
                                                      701/36
2017/0236422 A1* 8/2017 Naka ...................... G08G 1/165
                                                      701/301
(Continued)

FOREIGN PATENT DOCUMENTS

DE        102023132342 A1 *  8/2024  ............ B60W 50/14
EP            2085279 A1 *  8/2009  ......... B62D 15/0265
(Continued)

OTHER PUBLICATIONS

DE-102023132342-A1 translation (Year: 2024).*
(Continued)

*Primary Examiner* — Kyle T Johnson
(74) *Attorney, Agent, or Firm* — Slater Matsil, LLP

(57) ABSTRACT

Various embodiments of the present disclosure relate to a vehicle for avoiding collisions and a method of operating the vehicle. In an embodiment, a vehicle for avoiding a collision can include a plurality of sensors configured to obtain surrounding environment information and a processor operatively connected to the plurality of sensors. The processor can determine whether a line of a driving lane is at least partially detected based on line detection information included in the surrounding environment information, determine a maximum lateral movement distance for in-lane
(Continued)

collision avoidance based on a position of the line when the line is at least partially detected, and determine the maximum lateral movement distance for in-lane collision avoidance based on a preset value when the line is not detected.

20 Claims, 9 Drawing Sheets

(51) Int. Cl.
  *B60W 40/072* (2012.01)
  *B60W 40/076* (2012.01)
  *G08G 1/16* (2006.01)

(58) Field of Classification Search
  CPC .... B60W 30/095; B60W 30/12; B60W 40/04;
      B60W 2552/15; B60W 2552/30; B60W
      2552/53; B60W 2420/403; B60W 40/06;
      B60W 2554/40; G08G 1/167
  See application file for complete search history.

(56) References Cited

U.S. PATENT DOCUMENTS

| | | | |
|---|---|---|---|
| 2018/0178783 A1* | 6/2018 | Saiki | B60W 30/09 |
| 2019/0108754 A1* | 4/2019 | Baek | G08G 1/166 |
| 2020/0172100 A1* | 6/2020 | Kato | G08G 1/16 |
| 2021/0253093 A1* | 8/2021 | Morotomi | G08G 1/166 |
| 2021/0402992 A1* | 12/2021 | Morimoto | B60W 30/12 |
| 2022/0017079 A1* | 1/2022 | Kakeshita | B60W 30/09 |
| 2022/0063668 A1* | 3/2022 | Wallin | B60W 60/00274 |
| 2022/0169281 A1* | 6/2022 | Lin | G06V 20/588 |
| 2024/0174223 A1* | 5/2024 | Park | B60W 40/04 |
| 2024/0177611 A1* | 5/2024 | Lee | B60W 50/14 |

FOREIGN PATENT DOCUMENTS

| | | | | |
|---|---|---|---|---|
| EP | 2837538 B1 * | 6/2021 | | B60W 10/184 |
| EP | 4250048 A1 * | 9/2023 | | G08G 1/096725 |
| WO | 2022232823 A1 | 11/2022 | | |

OTHER PUBLICATIONS

Obstacle_detection_and_safely_navigate_the_autonomous_ vehicle2020 (Year: 2020).*

European Patent Office, European Search Report issued in European patent application No. 23211041, May 15, 2024, 3 pages.

* cited by examiner

310
OBJECT
DETECTING UNIT

320
LINE
DETECTING UNIT

330
COLLISION AVOIDANCE CONTROL UNIT

331
LINE
ESTIMATING UNIT

333
SURROUNDING
ENVIRONMENT
PREDICTING UNIT

335
RISK LEVEL
DETERMINING UNIT

337
IN-LANE AVOIDANCE STRATEGY DETERMINING UNIT

FIG. 4

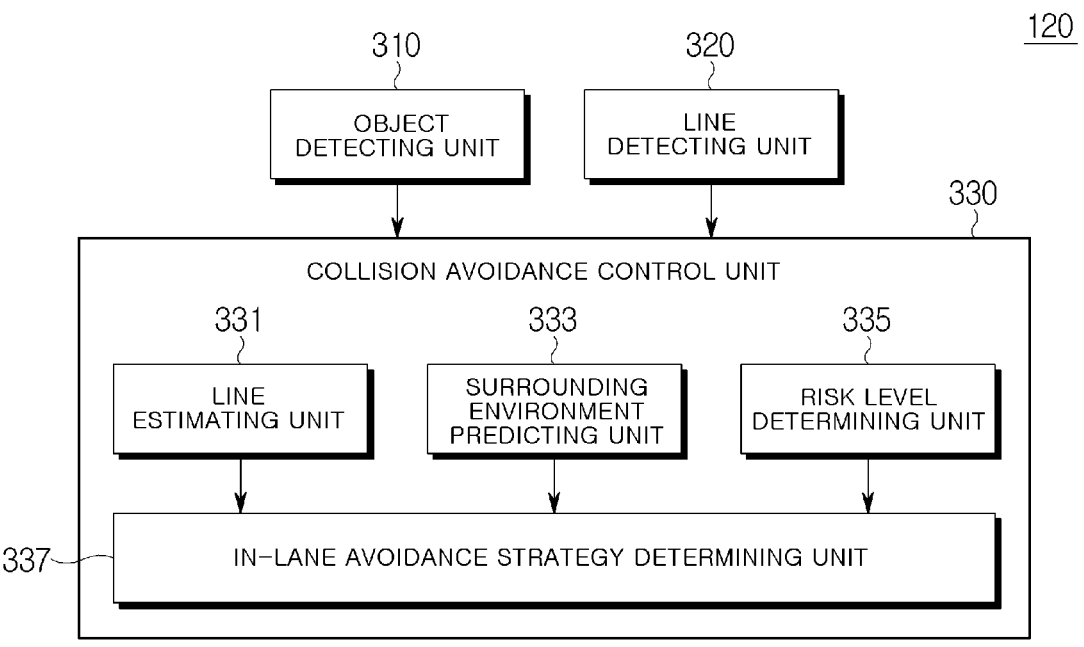

| | Case 1 (401) | Case 2 (402) | Case 3 (403) | Case 4 (404) |
|---|---|---|---|---|
| Type1 | | | | |
| line detection | Partially available | Available during past period | N/A | |
| Presence or absence of preceding vehicle | – | None | Exist | None |
| Maximum lateral movement distance | Left line: Determined based on CELM standard Right line: Estimated line – safety margin | 0.9 | 0.75 ~ 0.9 | 0.75 |

FIG. 6

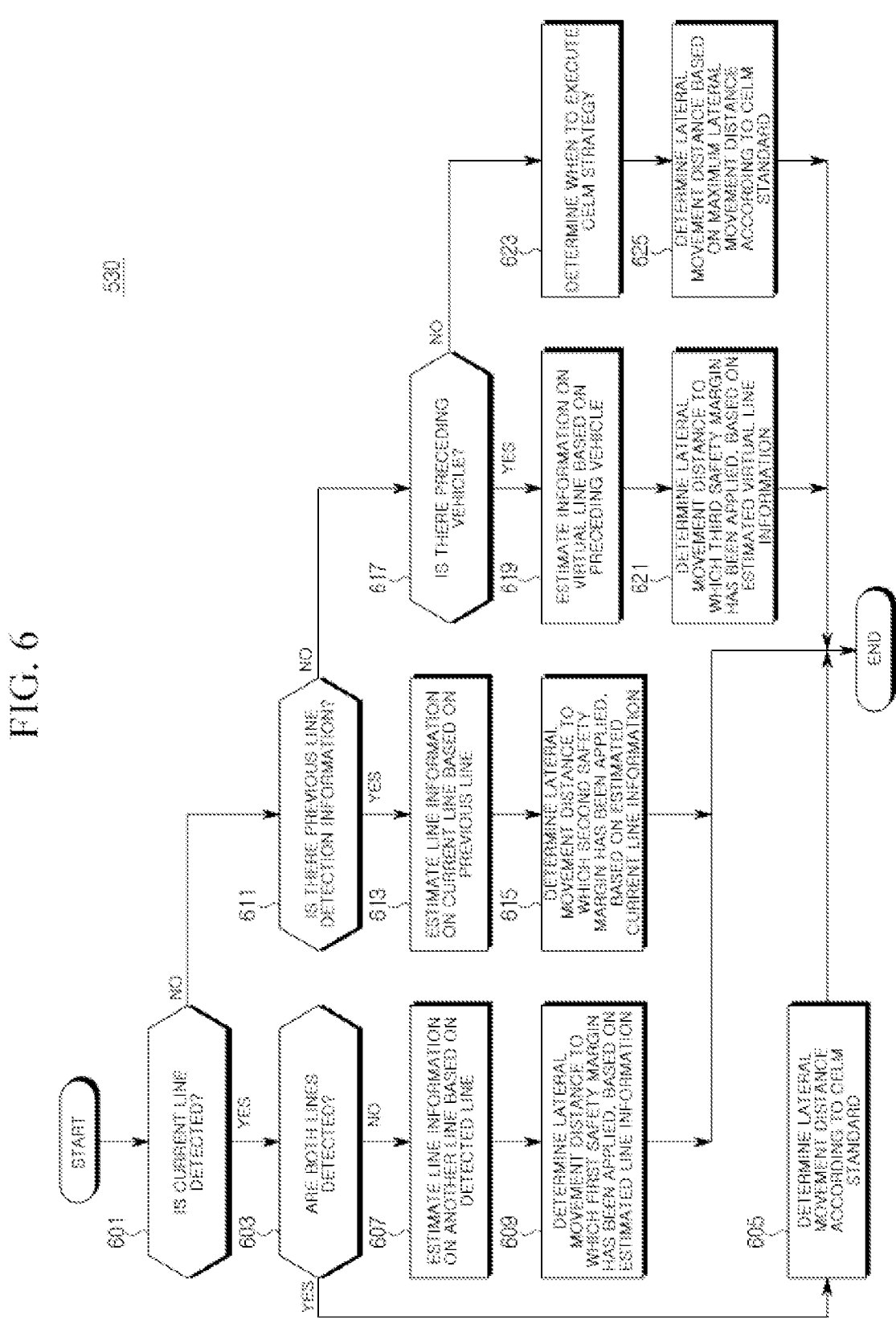

530

START

601 — IS CURRENT LINE DETECTED?

603 — ARE BOTH LINES DETECTED?

607 — ESTIMATE LINE INFORMATION ON ANOTHER LINE BASED ON DETECTED LINE

609 — DETERMINE LATERAL MOVEMENT DISTANCE TO WHICH FIRST SAFETY MARGIN HAS BEEN APPLIED, BASED ON ESTIMATED LINE INFORMATION

605 — DETERMINE LATERAL MOVEMENT DISTANCE ACCORDING TO CELM STANDARD

611 — IS THERE PREVIOUS LINE DETECTION INFORMATION?

613 — ESTIMATE LINE INFORMATION ON CURRENT LINE BASED ON PREVIOUS LINE

615 — DETERMINE LATERAL MOVEMENT DISTANCE TO WHICH SECOND SAFETY MARGIN HAS BEEN APPLIED, BASED ON ESTIMATED CURRENT LINE INFORMATION

617 — IS THERE PRECEDING VEHICLE?

619 — ESTIMATE INFORMATION ON VIRTUAL LINE BASED ON PRECEDING VEHICLE

621 — DETERMINE LATERAL MOVEMENT DISTANCE TO WHICH THIRD SAFETY MARGIN HAS BEEN APPLIED, BASED ON ESTIMATED VIRTUAL LINE INFORMATION

623 — DETERMINE WHEN TO EXECUTE CELM STRATEGY

625 — DETERMINE LATERAL MOVEMENT DISTANCE BASED ON MAXIMUM LATERAL MOVEMENT DISTANCE ACCORDING TO CELM STANDARD

END

FIG. 7

CASE 1　　　　　　CASE 4

CASE 2                    CASE 4

CASE 3                    CASE 4

VEHICLE FOR AVOIDING COLLISION AND METHOD OF OPERATING THE VEHICLE

CROSS-REFERENCE TO RELATED APPLICATIONS

This application claims the benefit of Korean Patent Application No. 10-2022-0160436, filed on Nov. 25, 2022, which application is hereby incorporated herein by reference.

TECHNICAL FIELD

Various embodiments of the present disclosure relate to a vehicle for performing collision avoidance.

BACKGROUND

An autonomous driving system or a driver assistance system refers to a system that controls a vehicle such that the vehicle itself drives without a driver's intervention, or intervenes in a driver's driving behavior to assist the driving behavior. Such an autonomous driving system or driver assistance system controls the behavior of the vehicle by detecting environment around the vehicle. For example, the autonomous driving system or driver assistance system detects an object located in a front area using a sensor device mounted in a vehicle, predicts a possibility of collision with the detected object, and determines whether it is necessary to control the behavior of the vehicle to avoid a collision.

Meanwhile, various systems for avoiding a collision with a front object in a vehicle have been provided. Examples of systems for collision avoidance may include an Autonomous Emergency Brake (AEB) system, a Forward Vehicle Collision Mitigation System (FVCMS), a Pedestrian Detection and Collision Mitigation System (PDCMS), and a Collision Evasive Lateral Manoeuvre (CELM) system.

SUMMARY

Various embodiments of the present disclosure relate to a vehicle for performing in-lane steering for collision avoidance and a method of operating the vehicle.

Among the collision avoidance systems described above, the CELM system controls the lateral movement of a vehicle within a lane to avoid collision with surrounding vehicles. Accordingly, when a situation in which line detection is difficult occurs due to surrounding environment and/or abnormal operation of sensors, it can be difficult to flexibly cope with a collision situation.

Accordingly, various embodiments of the disclosure provide a vehicle and a method of operating the same, which determine a vehicle's lateral movement distance when lines are at least partially undetected.

Various embodiments of the disclosure provide a vehicle and a method of operating the same, which determine a collision avoidance strategy in consideration of a vehicle's lateral movement distance when lines are at least partially undetected.

The technical tasks to be achieved in the present disclosure are not necessarily limited to the technical tasks mentioned above, and other technical tasks not mentioned can be clearly understood by those of ordinary skill in the art to which the present disclosure belongs from the description below.

According to various embodiments of the present disclosure, a vehicle for avoiding a collision can include a plurality of sensors configured to obtain surrounding environment information, and a processor operatively connected to the plurality of sensors, wherein the processor can determine whether a line of a driving lane is at least partially detected based on line detection information included in the surrounding environment information, determine a maximum lateral movement distance for in-lane collision avoidance based on a position of the line when the line is at least partially detected, and determine the maximum lateral movement distance for in-lane collision avoidance based on a preset value when the line is not detected.

According to an embodiment, the processor can estimate line information on an undetected line when the line is at least partially detected, and determine the maximum lateral movement distance based on the estimated line information, the estimated line information including at least one of a position or curvature of the undetected line, a rate of change in the curvature, and a road slope.

According to an embodiment, the case where a line is at least partially detected includes a case where one line of lines on both sides of the driving lane is detected and the other line is not detected and/or a case where there is detected information on a previous line located in a rear area of the vehicle but current lines on both sides of the vehicle located in a front area of the vehicle are not detected, and a maximum lateral movement distance when a line on the other side is not detected and a maximum lateral movement distance when the current lines on the both sides are not detected are determined differently from each other.

According to an embodiment, the processor can estimate information on the other line based on information on the detected one line when the one line is detected and the other line is not detected among the lines on both sides of the driving lane, and determine a maximum lateral movement distance to the other line based on the information on the other line and a specified first maximum lateral movement distance.

According to an embodiment, the maximum lateral movement distance to the other line can be calculated by subtracting a lateral distance between the one line and the vehicle from the specified first maximum lateral movement distance.

According to an embodiment, the processor can estimate information on the current lines on the both sides based on the detected information on the previous line when there is the detected information on the previous line located in a rear area of the vehicle but the current lines on both sides of the vehicle located in a front area of the vehicle are not detected, and determine a maximum lateral movement distance to one of the current lines on both sides based on the information on the current lines on both sides and a specified second maximum lateral movement distance.

According to an embodiment, the maximum lateral movement distance to one of the current lines on both sides can be determined based on a distance between the current lines on both sides, a width of the vehicle, or a lateral position of the vehicle at a time that detects the previous line and is limited to a value less than or equal to the specified second maximum lateral movement distance, and the specified second maximum lateral movement distance can have a value less than the specified first maximum lateral movement distance.

According to an embodiment, the processor can determine whether there is a preceding vehicle based on surrounding object information included in the surrounding environment information when the line is not detected, estimate information on lines on both sides based on a driving trajectory of the preceding vehicle when there is the preceding vehicle, and determine a maximum lateral movement distance to one of the estimated lines on both sides based on the estimated information on the lines on both sides.

According to an embodiment, the maximum lateral movement distance to one of the estimated lines on both sides can be determined based on a lateral position of the vehicle at a previous time point and is limited to a value less than or equal to a specified third maximum lateral movement distance, and the specified third maximum lateral movement distance can have a value less than the specified second maximum lateral movement distance.

According to an embodiment, the processor can determine when to start an in-lane collision avoidance operation when there is no preceding vehicle, and the maximum lateral movement distance for in-lane collision avoidance can be limited to a value less than or equal to a default maximum lateral movement distance which is the preset value. The default maximum lateral movement distance can have a value less than the specified second maximum lateral movement distance.

According to an embodiment, when to start the in-lane collision avoidance operation can be determined based on a lateral distance between the vehicle and a surrounding vehicle with which the vehicle is expected to collide among objects around the vehicle.

According to various embodiments, an operation method of a vehicle for avoiding a collision can include obtaining surrounding environment information, determining whether a line of a driving lane is at least partially detected based on line detection information included in the surrounding environment information, determining a maximum lateral movement distance for in-lane collision avoidance based on a position of the line when the line is at least partially detected, and determining the maximum lateral movement distance for in-lane collision avoidance based on a preset value when the line is not detected.

According to an embodiment, the determining of the maximum lateral movement distance for in-lane collision avoidance based on a position of the line can include estimating information on an undetected line when the line is at least partially detected, and determining the maximum lateral movement distance based on the estimated information on the line, and the estimated information on the line can include at least one of a position or curvature of the undetected line, a rate of change in the curvature, and a road slope.

According to an embodiment, the determining of the maximum lateral movement distance for in-lane collision avoidance based on a position of the line can include estimating information on the other line based on information on the detected one line when the one line is detected and the other line is not detected among the lines on both sides of the driving lane, and determining a maximum lateral movement distance to the other line based on the information on the other line and a specified first maximum lateral movement distance.

According to an embodiment, the lateral movement distance to the other line can be calculated by subtracting a lateral distance between the one line and the vehicle from the specified first maximum lateral movement distance.

According to an embodiment, the determining of the maximum lateral movement distance for in-lane collision avoidance based on the position of the line can further include estimating information on the current lines on the both sides based on the detected information on the previous line when there is detected information on a previous line located in a rear area of the vehicle but current lines on both sides of the vehicle located in a front area of the vehicle are not detected, and determining a maximum lateral movement distance to one of the current lines on both sides based on the information on the current lines on both sides and a specified second maximum lateral movement distance.

According to an embodiment, the lateral movement distance to one of the current lines on both sides can be determined based on a distance between the current lines on both sides, a width of the vehicle, or a lateral position of the vehicle at a time that detects the previous line and is limited to a value less than or equal to the specified second maximum lateral movement distance, and the specified second lateral movement distance can be a value less than the specified first maximum lateral movement distance.

According to an embodiment, the determining of the maximum lateral movement distance for in-lane collision avoidance based on a preset value can further include determining whether there is a preceding vehicle based on the surrounding environment information, estimating information on the lines on both sides based on a driving trajectory of the preceding vehicle when there is the preceding vehicle, and determining a maximum lateral movement distance to one of the estimated lines on both sides based on the estimated information on the estimated virtual lines on both sides and the preset value.

According to an embodiment, the maximum lateral movement distance to one of the virtual lines on both sides can be determined based on a lateral position of the vehicle at a previous time point and is limited to a value less than or equal to a specified third maximum lateral movement distance, and the specified third maximum lateral movement distance can be a value less than the specified second maximum lateral movement distance.

According to an embodiment, the determining of the maximum lateral movement distance for in-lane collision avoidance based on a preset value can further include determining when to start the in-lane collision avoidance operation when there is no preceding vehicle. The maximum lateral movement distance for in-lane collision avoidance can be limited to a value less than or equal to a default maximum lateral movement distance which is a preset value, and the default maximum lateral movement distance can be a value less than the specified second maximum lateral movement distance.

According to an embodiment, when to start the in-lane collision avoidance operation can be determined based on a lateral distance between the vehicle and a surrounding vehicle with which the vehicle is expected to collide among objects around the vehicle.

BRIEF DESCRIPTION OF THE DRAWINGS

FIG. 3 is a detailed configuration diagram of a processor according to various embodiments of the disclosure.

FIG. 4 is an exemplary diagram of a maximum movement distance in a lateral direction depending on whether or not a line is detected according to various embodiments of the present disclosure.

FIG. 6 is a flowchart for determining a lateral movement distance based on line detection information in a vehicle according to various embodiments of the present disclosure.

FIG. 7 is an exemplary diagram illustrating parameters for a vehicle and lines according to various embodiments of the present disclosure.

DETAILED DESCRIPTION OF ILLUSTRATIVE EMBODIMENTS

Figure 1:
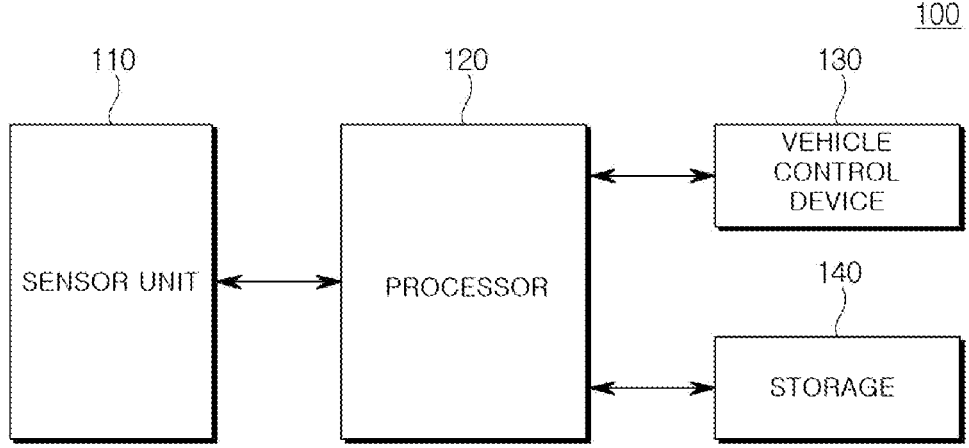
FIG. 1 is a block diagram of a vehicle according to various embodiments of the disclosure.

Hereinafter, the embodiments disclosed herein will be described in detail with reference to the accompanying drawings, and the same or similar elements are designated with the same numeral references regardless of the numerals in the drawings and their redundant description may be omitted.

The suffixes "module" or "unit or part" for components used in the following description can be merely provided for facilitation of preparing this specification, and thus they are not necessarily granted a specific meaning or function. In addition, "module" or "part" can be a software component or a hardware component such as a field programmable gate array (FPGA) or an application specific integrated circuit (ASIC), and the "module" or "part" can perform a certain role. However, the "part" or "module" is not necessarily limited to software or hardware. The "part" or "module" can be configured to be placed in an addressable storage medium or to restore one or more processors. Thus, for one example, the "part" or "module" can include components such as software components, object-oriented software components, class components, and task components, and can include processes, functions, attributes, procedures, subroutines, segments of a program code, drivers, firmware, microcode, circuits, data, databases, data structures, tables, arrays, and variables. Components and functions provided in the "part" or "module" can be combined with a smaller number of components and "parts" or "modules" or can be further divided into additional components and "parts" or "modules".

Methods or algorithm steps described relative to some embodiments of the present disclosure can be directly implemented by hardware and software modules that are executed by a processor or can be directly implemented by a combination thereof. The software module can be resident on a RAM, a flash memory, a ROM, an EPROM, an EEPROM, a resistor, a hard disk, a removable disk, a CD-ROM, or any other type of record medium known to those skilled in the art. An exemplary record medium is coupled to a processor and the processor can read information from the record medium and can record the information in a storage medium. In another way, the record medium can be integrally formed with the processor. The processor and the record medium can be resident within an application specific integrated circuit (ASIC). The ASIC can reside in a user terminal.

When it is determined that the detailed description of the related known technology can obscure the gist of embodiments disclosed herein in describing the embodiments, a detailed description thereof may be omitted. Further, the accompanying drawings are intended to facilitate understanding of the embodiments disclosed herein, and the technical spirit disclosed herein are not necessarily limited by the accompanying drawings. Therefore, the present disclosure should be construed as including all the changes, equivalents, and substitutions included in the spirit and scope of the present disclosure.

The terms coming with ordinal numbers such as 'first', 'second', or the like can be used to denote various components, but the components are not necessarily limited by the terms. The terms can be used merely for the purpose to distinguish a component from the other component.

It can also be understood that when an element is referred to as being "connected" or "coupled" to another element, it can be directly connected or coupled to the other element or intervening elements can be present. In contrast, when an element is referred to as being "directly connected" or "directly coupled" to another element, there are no intervening elements present in that embodiment.

Prior to a detailed description of the present disclosure, terms used herein may be defined as follows.

A vehicle can be equipped with an automated driving system (ADS) and can be capable of autonomous driving. For example, the vehicle can perform steering, acceleration, deceleration, lane change, stop (or pull over), or any combination thereof, without a driver's operation based on the ADS. The ADS can include, for example, a Pedestrian Detection and Collision Mitigation System (PDCMS), a Lane Change Decision Aid System (LCDAS), a Land Departure Warning System (LDWS), an Adaptive Cruise Control (ACC), a Lane Keeping Assistance System (LKAS), a Road Boundary Departure Prevention System (RBDPS), a Curve Speed Warning System (CSWS), a Forward Vehicle Collision Warning System (FVCWS), a Low Speed Following (LSF), a Collision Evasive Lateral Manoeuvre System (CELM), or any combination thereof.

The lane can refer to a left lane and/or a right lane defining a driving lane of a vehicle.

The Collision Evasive Lateral Manoeuvre System (CELM) system can refer to a system that controls the lateral movement of a vehicle within a lane to avoid a collision with surrounding vehicles. That is, the CELM system can refer to a system that allows a vehicle to move in a lateral direction for collision avoidance within a range of not invading the outer edges of lines on both sides of a lane in which the vehicle is driving.

FIG. 1 is a block diagram of a vehicle according to various embodiments of the disclosure.

FIG. 1 shows a configuration of a vehicle 100 according to an embodiment, in which each component can be configured as one chip, one part, or one electronic circuit, or a combination of chips, parts, and/or electronic circuits. According to an embodiment, some of the components shown in FIG. 1 can be separated into a plurality of components and configured as different chips, different parts, or different electronic circuits, and some components can be combined into one chip, one part, or one electronic circuit. According to an embodiment, some of the components shown in FIG. 1 can be omitted or other components not shown can be added.

Figure 2:
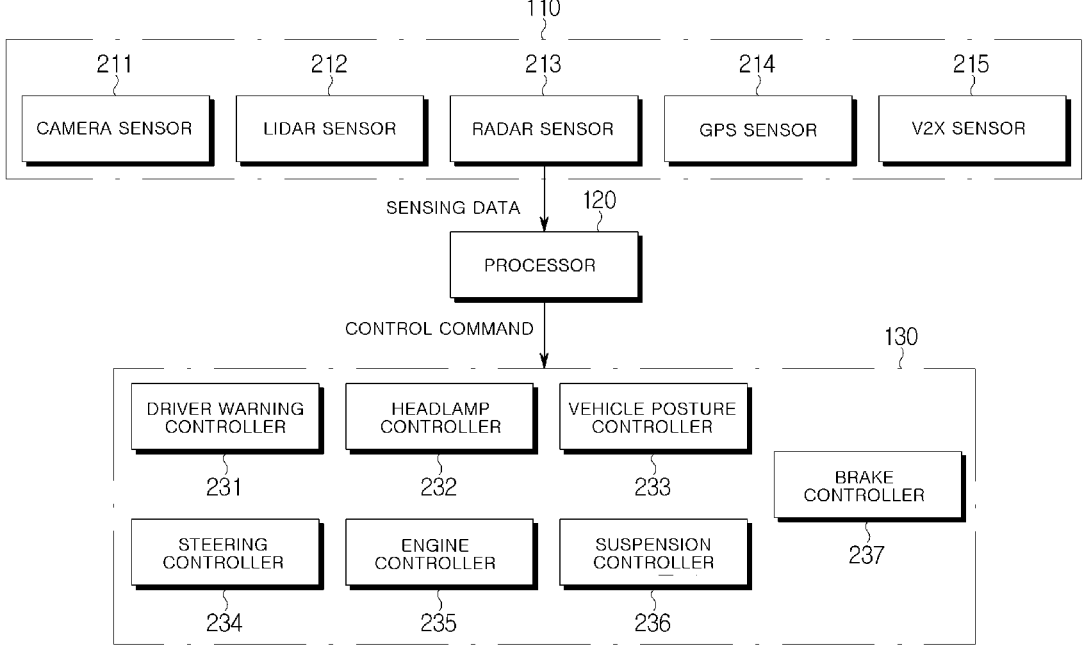
FIG. 2 is an exemplary diagram illustrating components of a vehicle according to various embodiments of the present disclosure.

Hereinafter, at least some of the components of FIG. 1 will be described with reference to FIGS. 2 to 4. FIG. 2 is an exemplary diagram illustrating components of a vehicle according to various embodiments of the present disclosure. FIG. 3 is a detailed configuration diagram of a processor according to various embodiments of the present disclosure. FIG. 4 is an exemplary diagram of a maximum movement distance in a lateral direction depending on whether or not a line is detected according to various embodiments of the present disclosure.

Referring to FIG. 1, the vehicle 100 can include a sensor unit 110, a processor 120, a vehicle control device 130, and a storage 140.

According to various embodiments, the sensor unit 110 can detect a surrounding environment of the vehicle 100 using at least one sensor provided in the vehicle 100, and generate data related to the surrounding environment based on a result of the detection. According to an embodiment, the sensor unit 110 can obtain surrounding object information based on sensing data obtained from at least one sensor. The surrounding object information can include the type of an object, the position of the object, the angle of the object, the size of the object, the shape of the object, a distance to the object, the speed of the object, a relative speed to the object, or any combination thereof. The surrounding object can include, for example, a surrounding vehicle, a pedestrian, a bicycle, an electric scooter, or any combination thereof.

According to an embodiment, the sensor unit 110 can measure a position of the vehicle 100 using at least one sensor. As shown in FIG. 2, the sensor unit 110 can include, for example, a camera sensor 211, a light detection and ranging (LIDAR) sensor 212, a radio detection and ranging (RADAR) sensor 213, a GPS sensor 214, a V2X sensor 215, or any combination thereof. The sensors shown in FIG. 2 are only examples for easy understanding, and the sensors of this document are not necessarily limited thereto. For example, although not shown in FIG. 2, the sensor unit 110 can include an infrared sensor.

The camera sensor 211 can be a device that senses an image of a subject photographed through a lens, processes the sensed image, and outputs processed image data. The camera sensor 211 can include an image sensor and an image processor. The camera sensor 211 can sense a front view, a side view, and a rear view of the vehicle 100. For example, the camera sensor 211 can obtain image data including surrounding vehicles located in a front area, a front-side area, a side area, a rear-side area, a rear area, or any combination thereof. Also, the camera sensor 211 can obtain image data including lines of a road on which the vehicle is driving. The camera sensor 211 can include a plurality of camera sensors mounted on the vehicle 100.

The LIDAR sensor 212 can measure distance, speed, and/or angle information of a surrounding object using a laser. The LIDAR sensor 212 can detect a surrounding object located in the front area, the front-side area, the side area, the rear-side area, the rear area, or any combination thereof, of the vehicle 100 using a laser.

The RADAR sensor 213 can measure the distance, speed, and/or angle of a surrounding object using electromagnetic waves. The RADAR sensor 213 can detect a surrounding object located in the front area, the front-side region, the side region, the rear-side region, the rear region, or any combination thereof, of the vehicle 100 using electromagnetic waves.

The GPS sensor 114 can measure the location, speed, and/or time of the vehicle 100 through communication with satellites. For example, the GPS sensor 114 can be a device that measures a delay time of a radio wave emitted from a satellite and obtain a current location based on a distance from an orbit.

The V2X sensor 215 can perform vehicle-to-vehicle communication (V2V), vehicle-to-infrastructure communication (V2I), and vehicle-to-network communication (V2N). The V2X sensor 115 can include a transceiver capable of transmitting and receiving radio frequencies. As an example of V2X communication, there can be a wireless communication method such as 4G/LTE, 5G, Wifi, Bluetooth, and the like. The V2X sensor 115 can receive information on other vehicles (or surrounding vehicles) (e.g., location, moving speed), traffic information (e.g., traffic congestion, whether an accident has occurred ahead), and/or entertainment information (e.g., video streaming, music streaming, news).

According to various embodiments, the processor 120 can control the overall operation of the vehicle 100. According to an embodiment, the processor 120 can include an electrical control unit (ECU) capable of integrally controlling components within the vehicle 100. For example, the processor 120 can include a central processing unit (CPU) or a micro controller unit (MCU) capable of performing arithmetic processing.

According to various embodiments, the processor 120 can obtain surrounding environment information based on the sensing data provided from the sensor unit 110, and determine an in-lane collision avoidance strategy (hereinafter referred to as 'CELM strategy') based on the obtained surrounding environment information. The surrounding environment information can include information on surrounding objects and/or line information.

According to various embodiments, the processor 120 can include an object detecting unit 310, a line detecting unit 320, and a collision avoidance control unit 330, as shown in FIG. 3, and determine one CELM strategy among a plurality of CELM strategies based on surrounding vehicles and line information.

According to various embodiments, the object detecting unit 310 can detect information on a surrounding object based on sensing data provided from the sensor unit 110. The information on the surrounding object can include a moving speed of the surrounding object, a moving direction of the surrounding object, a size of the surrounding object, a distance to the surrounding object, a position of the surrounding object, or any combination thereof. The surrounding object can include, for example, a surrounding vehicle, a pedestrian, a bicycle, an electric scooter, or any combination thereof. According to an embodiment, the object detecting unit 310 can detect information of a preceding vehicle.

According to various embodiments, the line detecting unit 320 can detect line information of a lane in which the vehicle 100 is driving from sensing data provided from the sensor unit 110. The line information can include location and/or shape information of the line. The shape information of the line can include a line curvature, a change rate in curvature, a road slope, or any combination thereof, for example. According to an embodiment, the line information can include only line information for at least a portion of a lane in which the vehicle 100 is driving according to the surrounding environment and/or vehicle condition. For example, depending on weather, road conditions, and/or whether the sensor unit 110 is in a normal operating state, the line information detected by the line detecting unit 320 can include only information on the right line with respect to the vehicle 100, information on the left line with respect to the vehicle 100, or only information on the previous line. The previous line can refer to a line located at the rear side region and/or the rear region of the vehicle 100. That is, the information on the previous line can refer to information on the line acquired while the vehicle 100 was driving at a previous point in time.

According to various embodiments, the collision avoidance control unit 330 can determine a CELM strategy for collision avoidance based on surrounding object information and line information provided from the object detecting unit 310 and the line detecting unit 320 and perform a control operation for performing the determined CELM strategy. As shown in FIG. 3, the collision avoidance control unit 330 can include a line estimating unit 331, a surrounding environment predicting unit 333, a risk level determining unit 335, and an in-lane avoidance strategy determining unit 337.

According to various embodiments, the line estimating unit 331 can estimate the location and/or shape of a non-detected line based on line information provided from the line detecting unit 320. According to an embodiment, when only line information on a line located on one side of the vehicle 100 is obtained from the line detecting unit 320, the line estimating unit 331 can estimate line information on a line located on the other side of the vehicle 100 based on the received line information. For example, when only right line information is obtained from the line detecting unit 320, the line estimating unit 331 can estimate left line information (e.g., location and/or shape) based on the received right line information. According to an embodiment, when only the information on the previous lines of the vehicle 100 is obtained from the line detecting unit 320, the line estimating unit 331 can estimate information of current lines (e.g., location) based on the received information on the previous lines. The current lines can be lines located on the side region, front-side region, and/or front region of the vehicle 100. That is, the information on the current line can include the position of a line along which the vehicle 100 is to travel, the curvature of the line, a change rate in curvature, a road slope, or any combination thereof. According to an embodiment, when line information is not obtained from the line detecting unit 320, the line estimating unit 331 can obtain information on a preceding vehicle from the object detector 310, and estimate virtual line information (e.g., location and/or shape) based on the information on the preceding vehicle. The information on the preceding vehicle can include information indicating a change in location of the preceding vehicle. For example, the information on the preceding vehicle can include the location of the preceding vehicle at a previous time point and the location of the preceding vehicle at a current time point.

According to an embodiment, the line estimating unit 331 can estimate an undetected line using Equation 1 below.

Equation 1 below can define each line as a third-order polynomial model.

[Equation 1]

$$Lane(x)_i = a_i x^3 + b_i x^2 + c_i x + d_i, i = \{l, r\}$$

where "a" can be a change rate in curvature, "b" can be a curvature, "c" can be a road slope, and "d" can be a lateral distance. For example, $d_l$ can denote a lateral distance between the vehicle and the left line, and $d_r$ can denote a lateral distance between the vehicle and the right line. The line estimating unit 331 can estimate information on an undetected line by obtaining the third-order polynomial model for the undetected line based on the change rate in curvature of a detected line, the curvature of the detected line, and the road slope. The undetected line can include a line located on one side of the vehicle 100 as described above, a current line, and/or a virtual line.

Here, the coefficients (a, b, c) of the third-order polynomial model for estimating the virtual line can be obtained using a traveling trajectory of the preceding vehicle as shown in Equation 2 below.

$$minimize \|Ax - b\|_2 \qquad [Equation\ 2]$$

$$x = \begin{bmatrix} a \\ b \\ c \end{bmatrix}$$

$$A = \begin{bmatrix} x^3(t) & x^2(t) & x(t) \\ \vdots & \vdots & \vdots \\ x^5(t-e) & a^2(t-\varepsilon) & x(t-\varepsilon) \end{bmatrix} b = \begin{bmatrix} y(t) \\ \vdots \\ y(t-\varepsilon) \end{bmatrix}$$

where x(t) can denote an x-axis position coordinate of the preceding vehicle at a current time point, and y(t) can denote a y-axis location coordinate of the preceding vehicle. x(t–ε) can denote the x-axis location coordinate of the preceding vehicle at the previous time point (t–ε), and y(t–ε) can denote the y-axis location coordinate of the preceding vehicle at the previous time point (t–ε).

According to various embodiments, the surrounding environment predicting unit 333 can predict (or estimate) a change in the surrounding environment (e.g., a change in position of a surrounding object) based on surrounding object information and line information. In addition to the surrounding object information and line information, the surrounding environment predicting unit 333 can predict a change in the surrounding environment in further consideration of pre-stored road map information, road map information obtained through the sensor unit 110 (e.g., the V2X sensor 215), and/or information on intent (e.g., cut-off) information of a surrounding vehicle.

According to various embodiments, the risk level determining unit 335 can calculate a risk level of collision between the vehicle 100 and a surrounding object based on information on a surrounding object provided from the object detecting unit 310 and/or information on surrounding environment change information provided from the surrounding environment predicting unit 333. The risk level of collision can include, for example, at least one of a longitudinal collision risk index and a lateral collision risk index. The risk level of collision can be calculated based on a longitudinal distance between the vehicle 100 and the surrounding object, a lateral distance between the vehicle 100 and the surrounding object, a longitudinal relative speed between the vehicle 100 and the surrounding object, a lateral relative speed between the vehicle 100 and the surrounding object, a reaction time until the driver operates a brake, a stop distance considering the driver's reaction time, the system latency time of system hardware, the maximum longitudinal deceleration of the vehicle 100, or any combination thereof.

According to an embodiment, the in-lane avoidance strategy determining unit 337 can determine a CELM strategy for avoiding a collision with a surrounding object (e.g., surrounding vehicle) based on information provided from the object detecting unit 310, the line detecting unit 320, the line estimating unit 331, the surrounding environment predicting unit 333, the risk level determining unit 335, or any combination thereof. The CELM strategy can be classified into decelerating (DEC), evasive steering to left lane (ELL), evasive steering to right lane (ERL), evasive steering to left direction (ELD), and evasive steering to right direction (ERD) based on the presence or absence of detected and/or estimated lane information. Here, DEC can refer to a strategy of decelerating within a lane for collision avoidance. In the case of DEC, lateral control of the vehicle is typically not involved. The ELL can refer to a strategy for controlling the lateral movement of the vehicle within a lane such that the left side of the vehicle is moved to a position in contact with the left line in order to avoid a collision. The ERL can refer to a strategy for controlling the lateral movement of a vehicle within a lane such that the right side of the vehicle is moved to a position in contact with the right line for collision avoidance. The ELD can refer to a strategy for controlling the lateral movement of a vehicle such that the vehicle moves in a leftward direction for collision avoidance. The ERD can refer to a strategy for controlling the lateral movement of a vehicle such that the vehicle moves in a rightward direction for collision avoidance. Here, ELL and/or ERL can be selected when detected and/or estimated line information exists, and ELD and/or ERD can be selected when detected and estimated line information does not exist.

According to an embodiment, when both lines on both sides of the lane in which the vehicle 100 is driving are detected, ELL and/or ERL can be selected as the CELM strategy. A lateral movement distance in the ELL and/or ERL can be determined as the distance between the body of the vehicle and a corresponding line as defined in the CELM standard. In this document, the lateral movement distance can refer to a maximum movement distance for a lateral behavior. For example, the lateral movement distance in the ELL can be determined as a distance between the left side of the vehicle body and the left line, and the lateral movement distance in the ERL can be determined as the distance between the right side of the vehicle body and the right line. That is, when both lines on both sides of the vehicle 100 are detected, the lateral behavior of the ELL and ERL can be permitted within a range that does not exceed the outer edge of the left line.

According to an embodiment, when both lines on both sides of the vehicle 100 are not detected, ELD and/or ERD can be selected as the CELM strategy. A lateral movement distance in the ELD and/or ERD can be limited to a default maximum lateral movement distance. The default maximum lateral movement distance can be about 0.75 m, as defined in CELM.

As described above, the CELM standard can define a method for determining a lateral movement distance of a vehicle for in-lane collision avoidance when a line is detected and when a line is not detected. However, various situations can exist in a real environment, such as a situation in which a part of a line is detected and another part is not detected, or a situation in which a line is not detected but estimation of a line is possible.

Therefore, in this document, as shown in FIG. 4, a situation in which at least a part of a line is not detected is subdivided into CASE1 (401), CASE2 (402), CASE3 (403), and CASE4 (404), and a method for determining a lateral movement distance of a vehicle is proposed for each of the cases.

Referring to FIG. 4, CASE1 (401) is a case in which only the left line among lines on both sides of the vehicle 100 is detected. In this case, the in-lane avoidance strategy determining unit 337 can determine a distance between the left side of the vehicle body and the left line as the lateral movement distance for the ELL as defined in the CELM standard. In addition, the in-lane avoidance strategy determining unit 337 can obtain right line information estimated based on the left line from the line estimating unit 331 and determine a lateral movement distance for the ELR by applying a first safety margin based on the estimated right line information. For example, in a state where only the left line is detected and the right line is not detected, the lateral movement distance for the ELR can be determined as a value obtained by subtracting the first safety margin from a distance between the right side of the vehicle body and the estimated right line. Here, the first safety margin is applied because the location and/or shape of the estimated right line can be different from the location and/or shape of a practical right line.

According to an embodiment, the information on the undetected line in CASE1 401 can be estimated using Equation 1 based on the coefficients (a, b, c) of the third-order polynomial model representing the detected line, and the lateral movement distance toward the undetected line, that is, the estimated line, can be calculated as in Equation 3. Equation 3 below shows a method of calculating a lateral movement distance toward the right line when the right line is not detected with respect to the vehicle 100.

[Equation 3]

$$M_r = d_r = 1.5 - d_l$$

where $M_r$ can denote a lateral movement distance toward the right line side, which is the undetected line, $d_r$ can denote a distance between the right side of the body of the vehicle 100 and the right line, and $d_l$ can denote a distance between the right side of the body of the vehicle 100 and the left line. Here, 1.5 m can refer to a first maximum lateral movement distance in a case where only one line among lines on both sides of a lane in which the vehicle 100 is driving is detected. Here, the maximum lateral movement distance can be a value to which the first safety margin has been applied.

According to an embodiment, the lateral movement distance toward the detected line, that is, the left line, in CASE1 401 can be determined as a distance between the left side of the body of the vehicle body and the left line, as defined in the CELM standard. In this document, for convenience of description, a case in which only the left line among both lines is detected is described as an example of CASE1 401, but the same method can be applied to a case in which only the right line among both lines is detected.

Next, CASE2 402 is a case in which only a previous line is detected based on the location of the vehicle 100. In this case, the in-lane avoidance strategy determining unit 337 can obtain current line information estimated based on previous line information from the line estimating unit 331 and determine a lateral movement distance based on the estimated current line information. In this case, the lateral movement distance can be limited to have a value equal to or less than a second maximum lateral movement distance. The second maximum lateral movement distance can be set to a value greater than the default maximum lateral movement distance. For example, the second maximum lateral movement distance can be about 0.9 m. In this case, 0.9 m, which is the value of the second maximum lateral movement distance, is an exemplary value for understanding, which can be set and/or changed by a designer and/or a business operator. The second maximum lateral movement distance can be a value to which a second safety margin is applied. The second safety margin can be set to a value greater than the first safety margin such that the second maximum lateral movement distance is less than the first maximum lateral movement distance.

According to an embodiment, current line information in CASE2 402 can be estimated using Equation 1 based on the coefficients (a, b, and c) of the third-order polynomial model for the previous line, and the movement distance $M_t$ to one of estimated current lines can be calculated as in Equation 4.

$$M_t \geq \frac{W - W_v}{2} + y_0 \qquad \text{[Equation 4]}$$

where "W" can denote a distance between two lines on both sides, that is, the width of a lane, and $W_v$ can denote the width of the vehicle. Also, $y_o$ can denote the location of the vehicle in the lateral direction at a previous time point.

Next, CASE3 403 is a case where no front, side, and rear lines are detected based on the location of the vehicle 100, but a preceding vehicle exists. In this case, the in-lane avoidance strategy determining unit 337 can obtain a virtual line information estimated based on information of a preceding vehicle from the line estimating unit 331, and determine a lateral movement distance based on the estimated virtual line information. In this case, the lateral movement distance can be limited to have a value equal to or less than a third maximum lateral movement distance. The third maximum lateral movement distance can be set to a value greater than the default maximum lateral movement distance and less than the second maximum lateral movement distance. For example, the third maximum lateral movement distance can be set to a value greater than about 0.75 m and less than about 0.9 m. The third maximum lateral movement distance can be a value to which a third safety margin has been applied. The third safety margin can be set to a value greater than the second safety margin such that the third maximum lateral movement distance is less than the second maximum lateral movement distance.

According to an embodiment, virtual line information in CASE3 403 can be estimated based on Equations 1 and 4. In this case, when it is assumed that the preceding vehicle is driving at the center of a lane, that is, at the center between virtual lines on both sides, the movement distance $M_t$ to one of the virtual lines on both sides can be calculated as in Equation 5 below.

$$M_t = 0.75 + y_0 \qquad \text{[Equation 5]}$$

where $y_o$ can denote the lateral location of a host vehicle at a previous time point, and 0.75 can denote the default maximum lateral movement distance defined in the CELM standard.

Next, CASE4 404 is a case in which no front, side, and rear lines are detected with respect to the location of the vehicle 100, and no preceding vehicle exists. In this case, the in-lane avoidance strategy determining unit 337 can obtain information indicating that line estimation is hard from the line estimating unit 331, and determine the lateral movement distance in the right and/or left directions based on the CELM standard. That is, the lateral movement distance in CASE4 404 can be limited to have a value equal to or less than the default maximum lateral movement distance. As described above, the default maximum lateral movement distance can be about 0.75 m.

According to an embodiment, because line detection and/or line estimation are hard in CASE4 404, it is possible to define when to operate the CELM strategy as shown in Equation 6 below, unlike CASE1 401, CASE 402, and CASE3 403.

$$0.5\text{m} > \text{obj} \qquad \text{In[Equation 6]}$$

where objIn can denote a lateral distance between a surrounding vehicle and a host vehicle between which a collision is predicted. That is, in CASE4, the time when objIn is less than 0.5 m can be determined as a time when to operate the ELD or ERD strategy. In this case, 0.5 m is an exemplary value for better understanding, which can be set and/or changed by a designer and/or business operator.

In addition, the lateral movement distance $M_t$ in CASE4 404 can be limited to the default maximum lateral movement distance as shown in Equation 7.

$$M_t \leq 0.75 \qquad \text{[Equation 7]}$$

In Equation 7, 0.75 is the default maximum lateral movement distance defined in the CELM standard, and can refer to a maximum lateral movable distance of the vehicle when a line is not detected.

According to various embodiments, as shown in FIG. 4, the in-lane avoidance strategy determining unit 337 can determine a lateral movement distance of the vehicle based on line detection information and/or presence or absence of a preceding vehicle, and determine the final CELM strategy based on the lateral movement distance of the vehicle. For example, when line estimation is possible based on line detection information and/or preceding vehicle information, the in-lane avoidance strategy determining unit 337 can determine a strategy having the lowest risk of collision with a surrounding vehicle among the DEC, ELL, and ERL strategies in consideration of the lateral movement distance to the left line for the ELL strategy and the lateral movement distance to the right line for the ERL strategy. As another example, when line estimation is hard based on line detection information and/or preceding vehicle information, the in-lane avoidance strategy determining unit 337 can determine a strategy having the lowest risk of collision with a surrounding vehicle among the DEC, ELD, and ERD strategies in consideration of the lateral movement distance in the left direction for the ELD strategy and the lateral movement distance in the right direction for the ERD strategy. According to an embodiment, the in-lane avoidance strategy determining unit 337 can determine a final CELM strategy by using a pre-designed model to determine the CELM strategy. For example, the in-lane avoidance strategy determining unit 337 can determine a final CELM strategy by inputting a lateral movement distance of the vehicle for each CELM strategy to the pre-designed network model. As another example, the pre-designed network model can be designed to calculate the lateral movement distance of the vehicle according to each case, as shown in Equations 1 to 7.

According to an embodiment, when the risk level of collision determined by the risk level determining unit 335 is lower than a preset risk level, the in-lane avoidance strategy determining unit 337 can determine that there is no risk of collision with a surrounding object and may not select the final CELM strategy.

According to an embodiment, the in-lane avoidance strategy determining unit 337 may not select the final CELM strategy and may not limit the lateral movement distance (or movement amount) when the driver performs an evasive maneuver.

According to various embodiments, when the final CELM strategy is determined (or selected), the processor 120 can control the behavior of the vehicle according to the determined in-lane collision avoidance strategy in association with the vehicle control device 130. For example, when the determined CELM strategy is the ELL strategy, the processor 120 can provide an ELL execution command to the vehicle control device 130. When providing the ELL execution command to the vehicle control device 130, the processor 120 can provide information on a lateral movement distance for ELL execution.

As shown in FIG. 2, the vehicle control device 130 can include a driver warning controller 231, a headlamp controller 232, a vehicle posture controller 233, a steering controller 234, an engine controller 235, a suspension controller 236, a brake controller 237, and the like.

The driver warning controller 231 can generate an audio, video, or haptic warning signal to warn the driver of a specific dangerous situation. For example, to output a warning sound, the driver warning controller 231 can output a warning sound using a vehicle sound system. Alternatively, to display a warning message, the driver warning controller 231 can output the warning message through an HUD display or a side mirror display. Alternatively, to generate a warning vibration, the driver warning controller 231 can operate a vibration motor mounted on the steering wheel.

The headlamp controller 232 can be located in the front of the vehicle to control headlamps that secure the driver's view of the front of the vehicle at night. For example, the headlamp controller 232 can perform high beam control, low beam control, left and right auxiliary lamp control, adaptive headlamp control, and the like.

The vehicle posture controller 233 can be referred to as VDC (vehicle dynamic control) or ESC (electrical stability control), and can perform control for correcting the behavior of the vehicle by intervention of electronic equipment when the behavior of the vehicle becomes rapidly unstable due to the driver's urgent steering wheel operation or the condition of the road surface. For example, when sensors such as a wheel speed sensor, a steering angle sensor, a yaw rate sensor, and a cylinder pressure sensor detect a steering wheel operation and the steering angle of the steering wheel does not match the traveling direction of the wheels, the vehicle posture controller 233 can perform control to distribute the braking force of each wheel by using, for example, an anti-lock brake function (ABS).

The steering controller 234 can perform control on the motor driving power steering (MPDS) system that drives the steering wheel. For example, when collision of the vehicle is predicted, the steering controller 234 can control steering of the vehicle in a direction capable of avoiding a collision or minimizing damage. The steering controller 234 can receive a command requesting execution of the determined CELM strategy from the processor 120, and perform lateral control for the vehicle within the lane according to the received command. For example, when receiving an ELL execution command from the processor 120, the steering controller 234 can steer the vehicle to the left within a lane and control the vehicle to move to a location where the left side of the vehicle contact the left line. In this case, the steering controller 234 can control steering of the vehicle based on the lateral movement distance provided from the processor 120.

When the processor 120 receives data from an oxygen sensor, an air volume sensor, or a manifold absolute pressure sensor, the engine controller 235 can control components such as an injector, a throttle, and a spark plug according to a control command from the processor 120.

The suspension controller 236 can be a device that performs motor-based active suspension control. Specifically, for example, the suspension controller 236 can variably control the damping force of a shock absorber to provide a soft ride during normal driving and a hard ride during high-speed driving and a change in attitude to secure ride comfort and driving stability. In addition, the suspension controller 236 can also perform height control, attitude control, and the like, in addition to damping force control.

The brake controller 237 can control whether to operate the brake or not and controls the leg power of the brake. For example, when a frontal collision is predicted, the brake controller 237 can perform control to automatically operate an emergency brake according to the control command of the processor 120 regardless of whether the driver has operated the brake. Also, the brake controller 237 can also control lateral movement of the vehicle by generating a lateral brake control. For example, when a braking force is generated only on the left wheel by the brake controller 237, the vehicle moves in the left direction, and when a braking force is generated only on the right wheel, the vehicle moves in the right direction. For example, the brake controller 237 can receive a CELM execution command from the processor 120 and control the lateral movement of the vehicle such that the vehicle moves in the left or right direction according to the received CELM command. In this case, the brake controller 237 can control the lateral movement of the vehicle based on the lateral movement distance received from the processor 120.

According to various embodiments, the storage 140 (see FIG. 1) can store various programs and data for operation of the vehicle and/or the processor 120. According to an embodiment, the storage 140 can store various programs and data necessary to determine a CELM strategy. The storage 140 can store various programs and data for determining a lateral movement distance for the CELM strategy in a situation where at least a portion of a line is not detected.

As described above, the vehicle 100 according to various embodiments of the present disclosure can set a larger safety margin for lateral movement as the line detection and/or estimated line information is more inaccurate. For example, the safety margin for CASE2 can be set larger than the safety margin for CASE1, and the safety margin for CASE3 can be set larger than the safety margin for CASE2. In addition, the safety margin for CASE4 can be set larger than the safety margin for CASE3. Here, a larger safety margin can be a smaller maximum lateral movement distance. That is, the second maximum lateral movement distance for CASE2 can be set less than the first maximum lateral movement distance for CASE1, and the third maximum lateral movement distance for CASE3 can be set less than the second maximum lateral movement distance for CASE2. In addition, the maximum lateral movement distance for CASE4 is a value defined in the standard, and can be set less than the third maximum lateral movement distance for CASE3.

Figure 5:
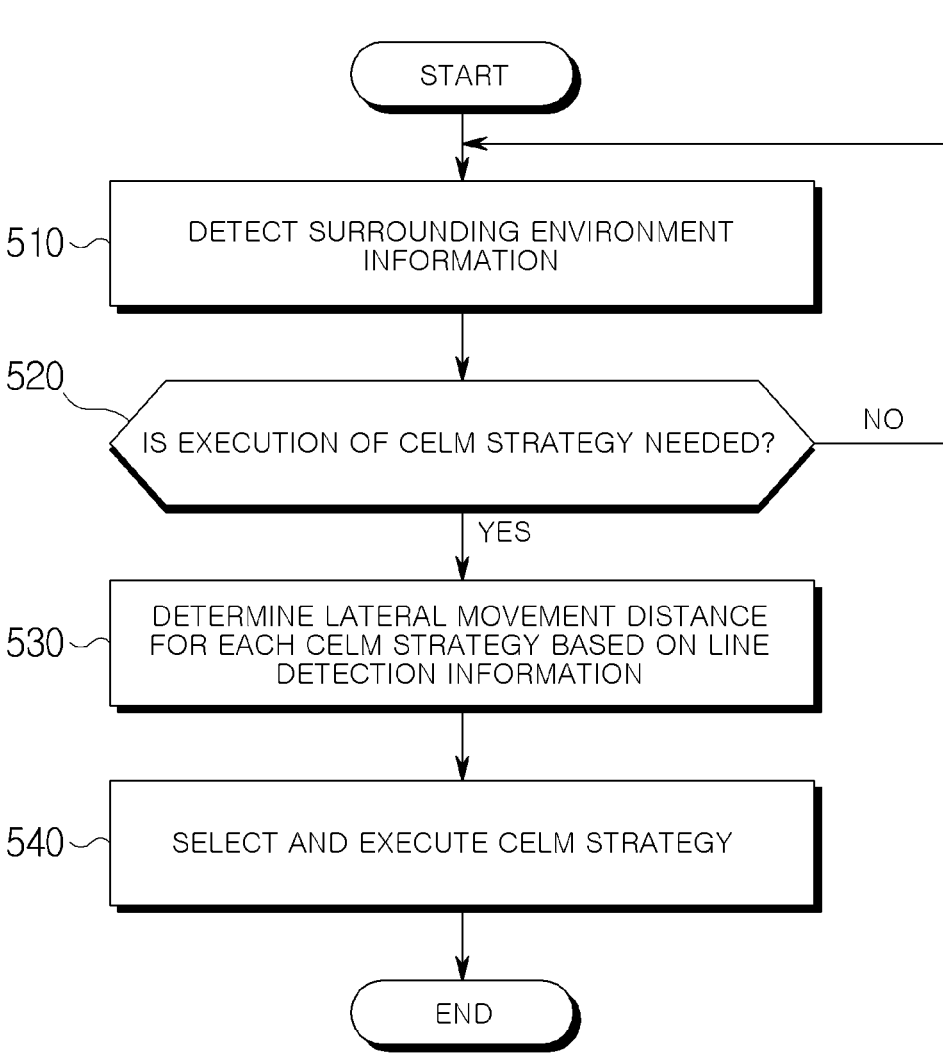
FIG. 5 is a flowchart of a method for selecting a CELM strategy in a vehicle according to various embodiments of the present disclosure.

FIG. 5 is a flowchart of a method for selecting a CELM strategy in a vehicle according to various embodiments of the present disclosure. In the following embodiments, operations can be performed sequentially, but not necessarily sequentially. For example, the order of operations can be changed, or at least two operations can be performed in parallel. In addition, operations to be described below can be performed by the processor 120 and/or at least one other component (e.g., the sensor unit 110 and/or the vehicle control device 130) included in the vehicle 100 or can be implemented as instructions executable by the processor 120 and/or at least one other component (e.g., the sensor unit 110 and/or the vehicle control device 130).

Referring to FIG. 5, the vehicle 100 can detect surrounding environment information in operation 510. According to an embodiment, the surrounding environment information can include surrounding object information and line information detected by the object detector 310 and/or the line detecting unit 320.

In operation 520, the vehicle 100 can determine whether it is required to perform a CELM strategy. According to an embodiment, the vehicle 100 can predict a change in the surrounding environment based on the surrounding environment information and determine a risk degree of collision with a surrounding object. For example, the vehicle 100 can obtain surrounding object information and line information based on sensing data obtained through the sensor unit 110, and estimate position information of a surrounding object at a future time point based on the surrounding object information and the line information at a current time point. The vehicle 100 can determine a collision risk degree based on the surrounding object information and/or the surrounding environment change information, and determine whether a CELM strategy needs to be executed based on the collision risk degree.

When it is determined that the CELM strategy needs to be executed, the vehicle 100 can determine a lateral movement distance for each of CELM strategies based on the lane detection information in operation 530. Here, the CELM strategies can be classified into decelerating (DEC), evasive steering to left lane (ELL), evasive steering to right lane (ERL), evasive steering to left direction (ELD), and evasive steering to right direction (ERD). The vehicle 100 can determine an allowable lateral movement distance of the vehicle in order to avoid a collision with a surrounding object while maintaining a driving lane in which the vehicle is driving. According to an embodiment, when lines on both sides of the driving lane are detected, the vehicle 100 can determine a lateral movement distance of the vehicle as defined in the CELM standard using line information on the both detected lines. According to an embodiment, when only a portion of lines on both sides of the driving lane are detected, the vehicle 100 can estimate the position and/or shape of a non-detected line based on information on the detected portion of the line and determine a lateral movement distance for the vehicle for each of the CELM strategies using the estimated information. A method of determining a lateral movement distance for each of the CELM strategies based on line detection information will be described in more detail with reference to FIGS. 6 through 7, and FIGS. 8A to 8D to be described later.

In operation 540, the vehicle 100 can select a final CELM strategy and execute the selected CELM strategy. According to an embodiment, the vehicle 100 can select the final CELM strategy that minimizes the risk of collision with a surrounding object based on the lateral movement distance for each CELM strategy, and control the vehicle control device 130 (e.g., the steering controller 234 and/or the brake controller 237) such that the selected CELM strategy is executed. The final CELM strategy can be selected using a pre-designed and/or trained network model.

Figure 7:
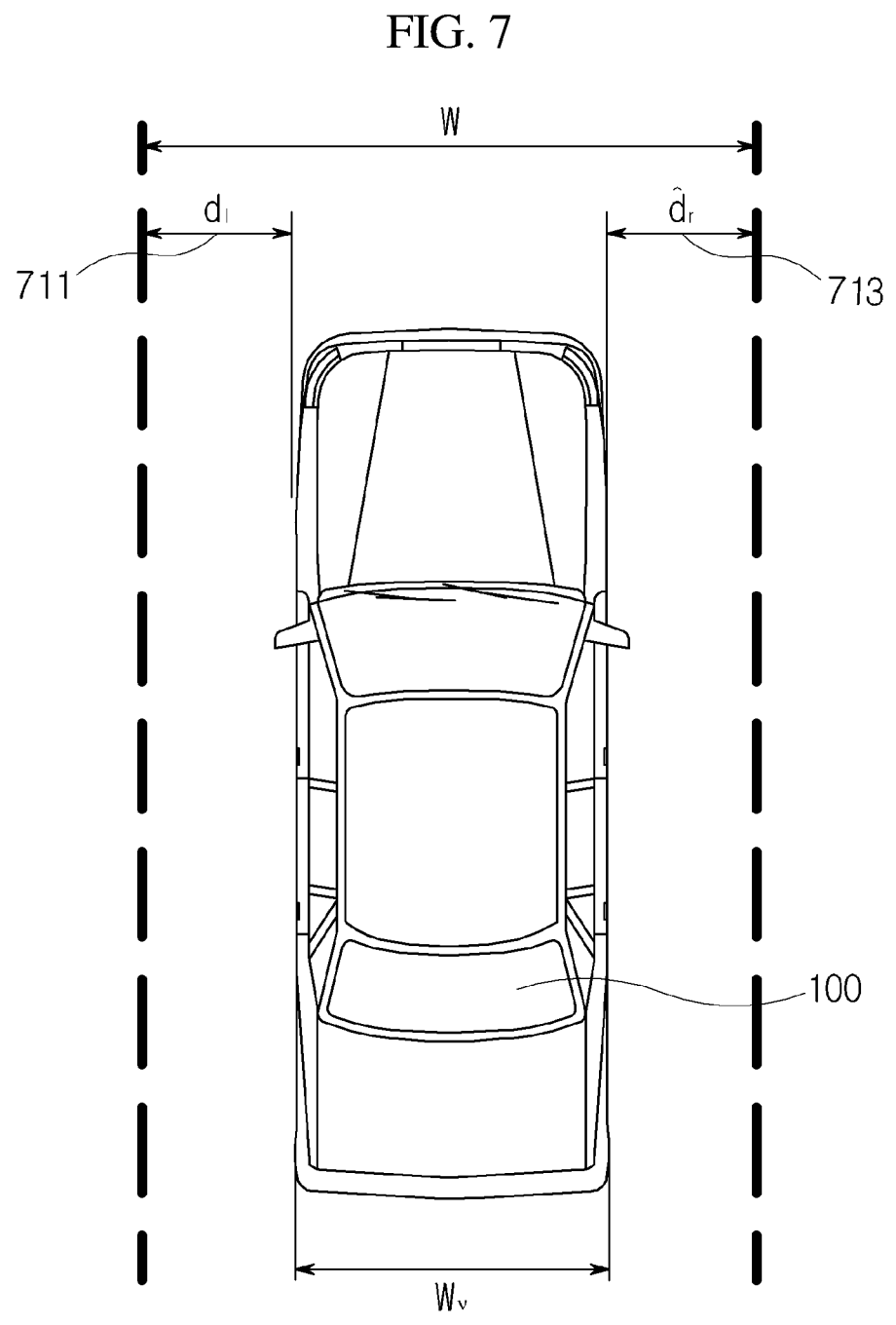

FIG. 6 is a flowchart for determining a lateral movement distance based on line detection information in a vehicle according to various embodiments of the present disclosure. Hereinafter, at least some operations of FIG. 6 can be sub-operations of operation 530 of FIG. 5. Hereinafter, at least some operations of FIG. 6 will be described with reference to FIG. 7 and FIGS. 8A to 8D. FIG. 7 is an exemplary diagram illustrating parameters for a vehicle and a line according to various embodiments of the present disclosure. Each of FIGS. 8A to 8D is an exemplary diagram illustrating a lateral movement distance of a vehicle for each line detection situation according to various embodiments of the present disclosure.

Referring to FIG. 6, the vehicle 100 can determine whether a current line is detected in operation 601. For example, the processor 120 (e.g., the line detecting unit 320) of the vehicle 100 can determine whether at least a portion of lines on both sides located in the front and/or front-side region of the driving lane on which the vehicle 100 is currently driving, through the sensor unit 110.

When the current line is detected, the vehicle 100 can determine whether both lines are detected in operation 603. For example, the vehicle 100 can determine whether both lines defining the driving lane on which the vehicle 100 is currently driving, that is, both the left line and the right line are detected, or whether only one of the lines on both sides is detected.

When both lines are detected, the vehicle 100 can determine a lateral movement distance according to the CELM standard in operation 605. For example, in the CELM standard, the lateral movement of a vehicle is permitted as long as the vehicle does not cross the outer boundary of the line. Accordingly, as shown in FIG. 7, when both lines on both sides of the vehicle 100 are detected, the vehicle 100 can determine a distance $(d_l)$ 711 between the left side of a vehicle body and the left line as a lateral movement distance toward the left line and determine the distance $d_r$ between the right side of the vehicle body and the right line as a lateral movement distance toward the right line.

Figure 8A:
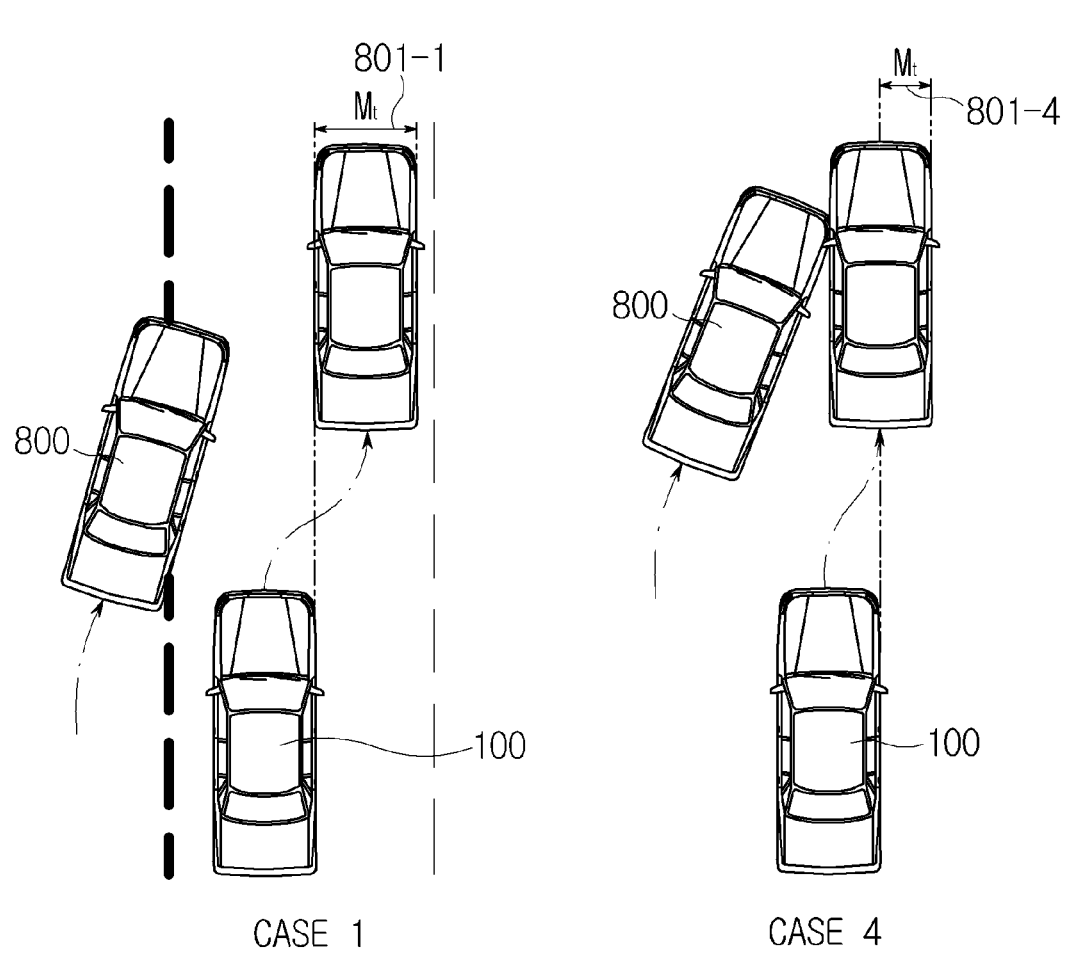
FIGS. 8A to 8D are exemplary diagrams illustrating lateral moving distances of a vehicle for line detection situations according to various embodiments of the present disclosure.
Figure 8B:
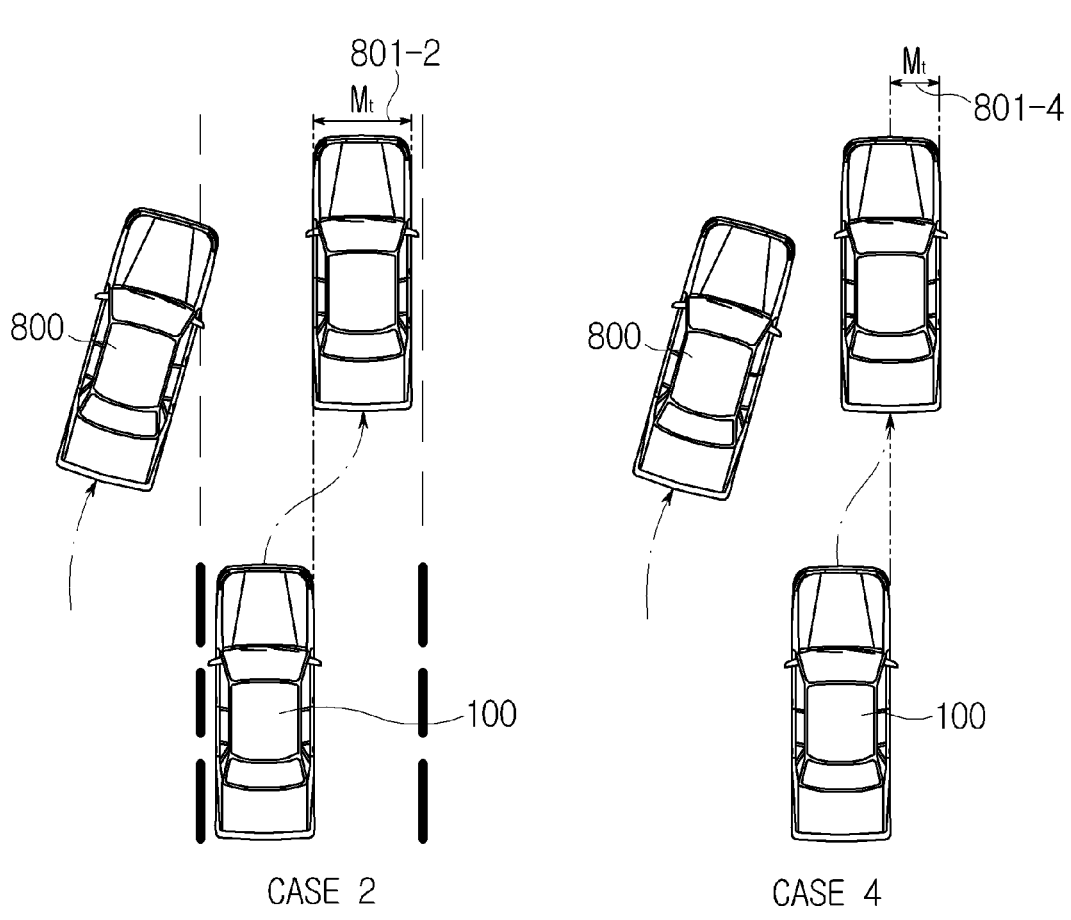

When both lines are not detected and only one line is detected, the vehicle 100 can estimate the other line information based on the detected line on one side in operation 607. For example, as shown in FIG. 8A, when the vehicle 100 detects a left line and does not detect a right line among lines on both sides of the vehicle 100, the vehicle 100 can estimate right line information based on the left line information by using Equation 1 described above. For example, the vehicle 100 can obtain coefficients $a_l$, $b_l$, and $c_l$ of a third-order polynomial model for the left line by expressing the left line as the third-order polynomial model such as Equation 1. The coefficients of the third-order polynomial model can include a rate of change in curvature $a_l$ of the left line, a curvature $b_l$ of the left line, a road slope $c_l$ of the left line, or any combination thereof. The vehicle 100 can estimate a third-order polynomial model for the right line using the coefficients of the third-order polynomial model for the left line, and obtain right line information (e.g., the position and/or shape information of the right line) based on the estimated third-order polynomial model.

The vehicle 100 can determine a lateral movement distance of the vehicle to which a first safety margin has been applied, based on the line information on a line on the other side estimated in operation 609. As shown in [CASE 1] of FIG. 8A, the vehicle 100 can determine a lateral movement distance $(M_r)$ 801-1 toward the right line by using the estimated right line information in order to avoid a collision with a surrounding vehicle 800 detected in the left direction of the vehicle 100. According to an embodiment, the vehicle 100 can determine a value obtained by subtracting the first safety margin from the distance between the right side of the vehicle body and the estimated right line as the lateral movement distance of the vehicle. According to an embodiment, as in Equation 3 above, the vehicle 100 can determine the lateral movement distance $(M_r)$ 801-1 toward the right line by subtracting the distance $d_1$ between the left side of the vehicle and the left line from a first maximum lateral movement distance (about 1.5 m). When it is necessary to determine the lateral movement distance with respect to the left line, the vehicle 100 can determine a distance between the left side of the vehicle body and the left line as the lateral movement distance toward the left line.

When the current line is not detected as a result of the determination in operation 601, the vehicle 100 can determine whether there is previous line detection information in operation 611. For example, as in [CASE 2] of FIG. 8B, when the current lines located in the front and/or the front-side region of the vehicle 100 with respect to the current position of the vehicle 100 are not detected, the vehicle 100 can determine whether there is previous line information on previous lines detected before the current time point, that is, at the past time point. The previous line detection information can include information on both lines located in the rear-side and/or rear region of the vehicle 100 with respect to the current position of the vehicle 100.

When there is previous line detection information, the vehicle 100 can estimate current line information based on the previous line in operation 613. For example, the vehicle 100 can estimate current line information on the current lines based on information on the previous lines using Equation 1 described above. For example, the vehicle 100 can obtain coefficients $a_i$, $b_i$, and $c_i$ of a third-order polynomial model for the previous line by expressing the previous line as the third-order polynomial model such as Equation 1. The coefficients of the third-order polynomial model can include a rate of change in curvature $a_l$ of the previous line, a curvature $b_l$ of the previous line, a road slope $c_l$ of the previous line, or any combination thereof. The vehicle 100 can estimate a third-order polynomial model for a current line using the coefficients of the third-order polynomial model for the previous line, and obtain current line information (e.g., the position and/or shape information of the previous line) based on the estimated third-order polynomial model.

In operation 615, the vehicle 100 can determine a lateral movement distance to which a second safety margin has been applied based on the estimated current line information. According to an embodiment, the vehicle 100 can determine a lateral movement distance toward the right line and/or a lateral movement distance toward the left line based on the estimated current line information. In this case, the lateral movement distance toward the right line and/or the lateral movement distance to the left line can be limited to values less than or equal to the second maximum lateral movement distance to which the second safety margin has been applied. For example, as shown in [CASE 2] of FIG. 8B, the vehicle 100 can determine a lateral movement distance ($M_r$) 801-2 toward the right line among the estimated current lines based on the information on the previous lines to avoid a collision with the surrounding vehicle 800 detected in the left side direction of the vehicle 100. In this case, the lateral movement distance ($M_r$) 801-2 toward the right line can be calculated using Equation 4 described above.

When there is no previous line detection information, the vehicle 100 can determine whether there is a preceding vehicle in operation 617. For example, the vehicle 100 can determine whether information on a preceding vehicle of the vehicle is obtained through the sensor unit 110.

Figure 8C:
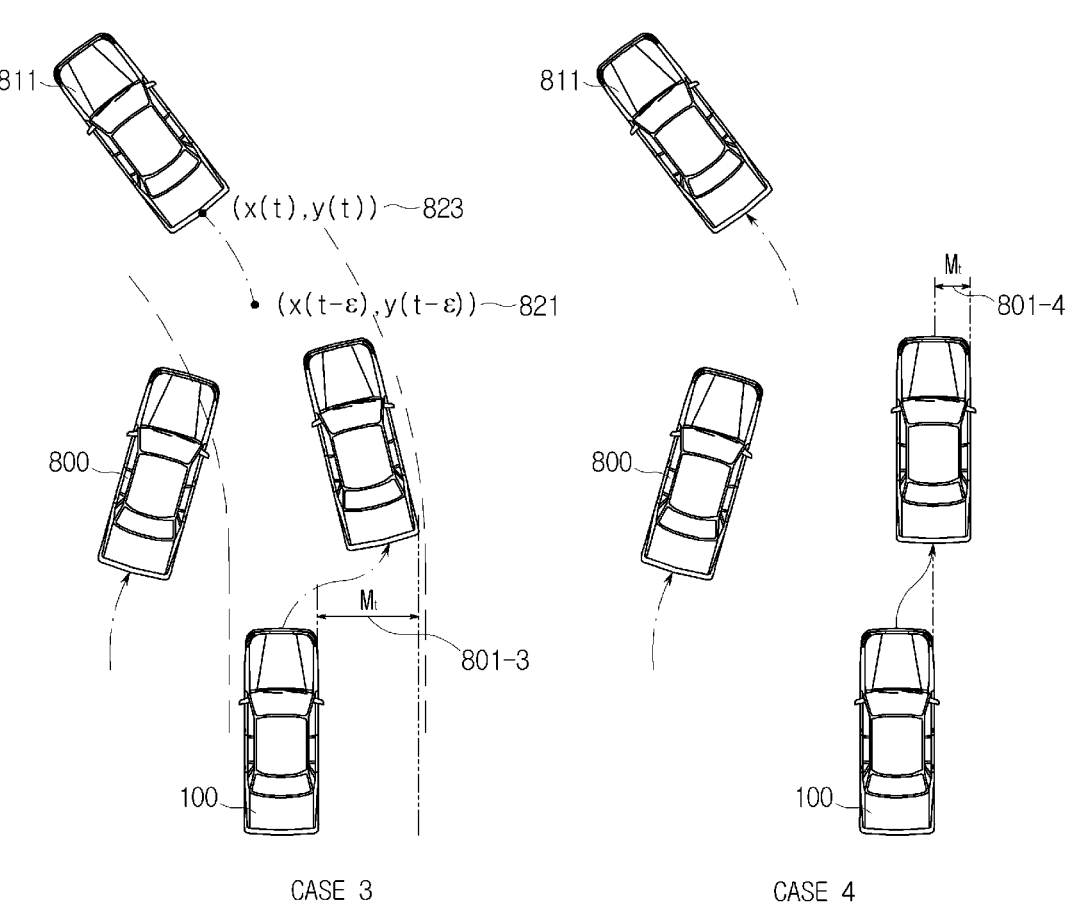
Figure 8D:
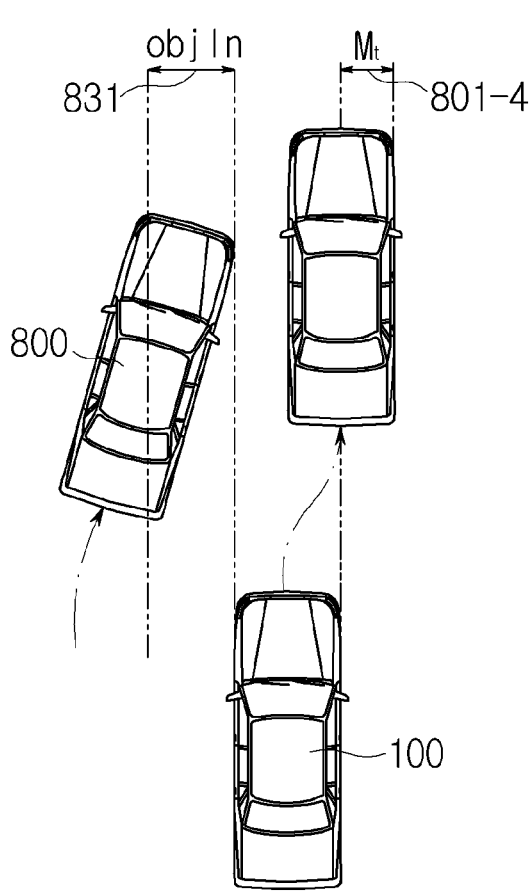

When there is a preceding vehicle, the vehicle 100 can estimate virtual line information based on the preceding vehicle in operation 619. For example, when the line of the lane in which the vehicle 100 is driving is not detected and there is a preceding vehicle 811 as in [CASE 3] of FIG. 8C, the vehicle 100 can estimate virtual line information. The virtual lines can refer to lines formed on both sides of the position and/or driving trajectory of the preceding vehicle 811. That is, the preceding vehicle 811 can drive in the center of a lane defined by the virtual lines. As expressed in Equation 2, the vehicle 100 can obtain the coefficients of the third-order polynomial model using the driving trajectory of the preceding vehicle. For example, as shown in [CASE 3]

of FIG. 8C, the vehicle 100 can provide position information (x(t), y(t)) 823 of the preceding vehicle 811 at the current time point (t) and position information (x(t−ε), y(t−ε)) 821 of the preceding vehicle 811 at a previous time point (t−ε) can be applied to Equation 2 to obtain coefficients of the third-order polynomial model. The vehicle 100 can estimate virtual line information on virtual lines by applying the obtained coefficients of the third-order polynomial model to Equation 1.

In operation 621, the vehicle 100 can determine a lateral movement distance to which a third safety margin has been applied based on the estimated virtual line information. According to an embodiment, the vehicle 100 can determine a lateral movement distance toward a right virtual line and/or a lateral movement distance toward a left virtual line based on the estimated virtual line information. In this case, the lateral movement distance toward the right ritual line and/or the lateral movement distance to the left virtual line can be limited to values less than or equal to the third maximum lateral movement distance to which the third safety margin has been applied. For example, as shown in [CASE 3] of FIG. 8C, the vehicle 100 can determine a lateral movement distance ($M_r$) 801-3 toward the right virtual line of the virtual lines in order to avoid a collision with a surrounding vehicle 800 detected in the left direction of the vehicle 100. The lateral movement distance ($M_r$) 801-3 toward the right virtual line of the virtual lines can be calculated using Equation 5 described above.

When there is no preceding vehicle, the vehicle 100 can determine when to execute the CELM strategy in operation 623. For example, as shown in [CASE 4] of FIG. 8D, when the lines of the lane in which the vehicle 100 is driving is not detected and there is no preceding vehicle, the vehicle 100 can determine when to execute the CELM strategy based on a lateral distance (objln) 831 to the surrounding vehicle 800. According to an embodiment, when to execute the CELM strategy can be determined using Equation 6.

In operation 625, the vehicle 100 can determine a lateral movement distance in the left direction and/or right direction based on the CLEM standard. According to an embodiment, the vehicle 100 can determine a lateral movement distance ($M_r$) 801-4 to be equal to or less than a default maximum lateral movement distance defined in the CELM standard, as shown in Equation 7.

Referring to CASE 1 to CASE 4 of FIGS. 8A to 8D described above, line estimation can be possible in CASE 1 to CASE 3 in which a line is at least partially detected or a preceding vehicle is present. Accordingly, in CASE1, CASE2, or CASE3, the vehicle can move more in the lateral direction than in CASE4 in which line estimation is hard. Therefore, in CASE1, CASE2, or CASE3, collision can be avoided more stably than CASE4.

According to various embodiments of the present disclosure, the vehicle can determine a lateral movement distance by estimating the position and/or shape of a line in a situation where the line is not at least partially detected, and determine a collision avoidance strategy based on the lateral movement distance, thus minimizing the risk of collision even in situations where the line is not detected.

What is claimed is:
1. A vehicle comprising:
   a plurality of sensors configured to obtain surrounding environment information; and
   a processor operatively coupled to the plurality of sensors, the processor being configured to:

determine whether a line of a driving lane is at least partially detected based on line detection information included in the surrounding environment information, determine a maximum lateral movement distance for in-lane collision avoidance based on a position of the line in response to the line being at least partially detected, and determine the maximum lateral movement distance for in-lane collision avoidance based on a preset value in response to the line being not detected, wherein the maximum lateral movement distance is determined to maintain the driving lane while avoiding a collision with surrounding objects; and a controller configured so the vehicle will avoid the collision based on the maximum lateral movement distance.

2. The vehicle of claim 1, wherein the processor is configured to:

estimate line information on an undetected line in response to the line being at least partially detected; and determine the maximum lateral movement distance based on the estimated line information, the estimated line information including one of or any combination of a position or curvature of the undetected line, a rate of change in the curvature, and a road slope.

3. The vehicle of claim 1, wherein the case where a line is at least partially detected includes one of or both of, a case where one line of lines on both sides of the driving lane is detected and the other line is not detected, and a case where there is detected information on a previous line located in a rear area of the vehicle but current lines on both sides of the vehicle located in a front area of the vehicle are not detected, and wherein the maximum lateral movement distance in response to the other line being not detected and the maximum lateral movement distance in response to the current lines on the both sides being not detected, are determined differently from each other.

4. The vehicle of claim 3, wherein the processor is configured to:

estimate information on the other line based on information on the detected one line in response to the one line being detected and the other line being not detected, among the lines on both sides of the driving lane, and determine a maximum lateral movement distance to the other line based on the information on the other line and a specified first maximum lateral movement distance.

5. The vehicle of claim 4, wherein the maximum lateral movement distance to the other line is calculated by subtracting a lateral distance between the one line and the vehicle from the specified first maximum lateral movement distance.

6. The vehicle of claim 3, wherein the processor is configured to:

estimate information on the current lines on the both sides based on the detected information on the previous line in response to there being the detected information on the previous line located in the rear area of the vehicle but the current lines on both sides of the vehicle located in the front area of the vehicle being not detected, and determine a maximum lateral movement distance to one of the current lines on both sides based on the information on the current lines on both sides and a specified second maximum lateral movement distance.

7. The vehicle of claim 6, wherein the maximum lateral movement distance to one of the current lines on both sides is determined based on a distance between the current lines on both sides, a width of the vehicle, or a lateral position of the vehicle at a time that detects the previous line, and is limited to a value less than or equal to the specified second maximum lateral movement distance, and wherein the specified second maximum lateral movement distance has a value less than a specified first maximum lateral movement distance.

8. The vehicle of claim 1, wherein the processor is configured to:

determine whether there is a preceding vehicle based on surrounding object information included in the surrounding environment information in response to the line being not detected;

estimate information on the lines on both sides based on a driving trajectory of the preceding vehicle in response to there being the preceding vehicle; and determine a maximum lateral movement distance to one of the estimated lines on both sides based on the estimated information on the lines on both sides.

9. The vehicle of claim 8, wherein the maximum lateral movement distance to one of the estimated lines on both sides is determined based on a lateral position of the vehicle at a previous time point and is limited to a value less than or equal to a specified third maximum lateral movement distance, and wherein the specified third maximum lateral movement distance has a value less than a specified second maximum lateral movement distance.

10. The vehicle of claim 9, wherein the processor is configured to determine when to start an in-lane collision avoidance operation in response to there being no preceding vehicle, wherein the maximum lateral movement distance for in-lane collision avoidance is limited to a value less than or equal to a default maximum lateral movement distance which is the preset value, and wherein the default maximum lateral movement distance has a value less than the specified second maximum lateral movement distance.

11. The vehicle of claim 10, wherein when to start the in-lane collision avoidance operation is determined based on a lateral distance between the vehicle and a surrounding vehicle with which the vehicle is expected to collide among objects around the vehicle.

12. An operation method of a vehicle for avoiding a collision, comprising:

obtaining surrounding environment information;

determining whether a line of a driving lane is at least partially detected based on line detection information included in the surrounding environment information;

determining a maximum lateral movement distance for in-lane collision avoidance based on a position of the line in response to the line being at least partially detected; and determining the maximum lateral movement distance for in-lane collision avoidance based on a preset value in response to the line being not detected, wherein the maximum lateral movement distance is determined to maintain the driving lane while avoiding the collision with surrounding objects; and controlling the vehicle to avoid the collision based on the maximum lateral movement distance.

13. The operation method of claim 12, wherein the determining of the maximum lateral movement distance for in-lane collision avoidance based on the position of the line comprises:

estimating information on an undetected line in response to the line being at least partially detected; and determining the maximum lateral movement distance based on the estimated information on the line, wherein the estimated information on the line includes one of or any combination of a position or curvature of the undetected line, a rate of change in the curvature, and a road slope.

14. The operation method of claim 12, wherein the case where a line is at least partially detected includes one of or both of a case where one line of lines on both sides of the driving lane is detected and the other line is not detected, and a case where there is detected information on a previous line located in a rear area of the vehicle but current lines on both sides of the vehicle located in a front area of the vehicle are not detected, and wherein the maximum lateral movement distance in response to the other line being not detected and the maximum lateral movement distance in response to the current lines on the both sides being not detected, are determined differently from each other.

15. The operation method of claim 14, wherein the determining of the maximum lateral movement distance for in-lane collision avoidance based on the position of the line comprises:

estimating information on the other line based on information on the detected one line in response to the one line being detected and the other line being not detected among the lines on both sides of the driving lane; and determining a maximum lateral movement distance to the other line based on the information on the other line and a specified first maximum lateral movement distance.

16. The operation method of claim 15, wherein the determining of the maximum lateral movement distance for in-lane collision avoidance based on the position of the line comprises:

estimating information on the current lines on the both sides based on the detected information on the previous line in response to there being detected information on the previous line located in the rear area of the vehicle but the current lines on both sides of the vehicle located in the front area of the vehicle being not detected; and determining a maximum lateral movement distance to one of the current lines on both sides based on the information on the current lines on both sides and a specified second maximum lateral movement distance, wherein the specified second maximum lateral movement distance has a value less than the specified first maximum lateral movement distance.

17. The operation method of claim 16, wherein the determining of the maximum lateral movement distance for in-lane collision avoidance based on the preset value comprises:

determining whether there is a preceding vehicle based on the surrounding environment information;

estimating information on the lines on both sides based on a driving trajectory of the preceding vehicle in response to there being the preceding vehicle; and determining a maximum lateral movement distance to one of the estimated lines on both sides based on the estimated information on the lines on both sides and the preset value.

18. The operation method of claim 17, wherein the maximum lateral movement distance to one of virtual lines on both sides is determined based on a lateral position of the vehicle at a previous time point and is limited to a value less than or equal to a specified third maximum lateral movement distance, and wherein the specified third maximum lateral movement distance has a value less than the specified second maximum lateral movement distance.

19. The operation method of claim 18, wherein the determining of the maximum lateral movement distance for in-lane collision avoidance based on the preset value comprises determining when to start the in-lane collision avoidance operation in response to there being no preceding vehicle, wherein the maximum lateral movement distance for in-lane collision avoidance is limited to a value less than or equal to a default maximum lateral movement distance which is the preset value, wherein the default maximum lateral movement distance is a value less than the specified second maximum lateral movement distance, and wherein when to start the in-lane collision avoidance operation is determined based on a lateral distance between the vehicle and a surrounding vehicle with which the vehicle is expected to collide among objects around the vehicle.

20. A vehicle comprising:

a plurality of sensors configured to obtain surrounding environment information; and a processor operatively coupled to the plurality of sensors, the processor being configured to:

determine whether a line of a driving lane is at least partially detected based on line detection information included in the surrounding environment information, determine a maximum lateral movement distance for in-lane collision avoidance based on a position of the line in response to the line being at least partially detected, and determine the maximum lateral movement distance for in-lane collision avoidance based on a preset value in response to the line being not detected, determine whether there is a preceding vehicle based on surrounding object information included in the surrounding environment information in response to the line being not detected, estimate information on the lines on both sides based on a driving trajectory of the preceding vehicle in response to there being the preceding vehicle, and determine a maximum lateral movement distance to one of the estimated lines on both sides based on the estimated information on the lines on both sides, wherein the maximum lateral movement distance to one of the estimated lines on both sides is determined based on a lateral position of the vehicle at a previous time point and is limited to a value less than or equal to a specified third maximum lateral movement distance, the specified third maximum lateral movement distance having a value less than a specified second maximum lateral movement distance; and a controller configured so the vehicle will avoid the collision based on the maximum lateral movement distance.

* * * * *